(12) United States Patent
Yasrebi et al.

(10) Patent No.: US 8,799,973 B2
(45) Date of Patent: *Aug. 5, 2014

(54) METHODS AND APPARATUS FOR SELECTING AND PUSHING CUSTOMIZED ELECTRONIC MEDIA CONTENT

(71) Applicant: AT&T Intellectual Property I, L.P., Atlanta, GA (US)

(72) Inventors: Mehrad Yasrebi, Austin, TX (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,536

(22) Filed: Mar. 21, 2013

(65) Prior Publication Data

US 2013/0227068 A1   Aug. 29, 2013

Related U.S. Application Data

(63) Continuation of application No. 11/530,711, filed on Sep. 11, 2006, now Pat. No. 8,429,702.

(51) Int. Cl.
*H04N 7/173* (2011.01)
*H04N 7/18* (2006.01)

(52) U.S. Cl.
USPC ............................................. 725/105; 725/80

(58) Field of Classification Search
None
See application file for complete search history.

(56) References Cited

U.S. PATENT DOCUMENTS

| | | |
|---|---|---|
| 5,710,884 A | 1/1998 | Dedrick |
| 5,717,923 A | 2/1998 | Dedrick |
| 5,724,521 A | 3/1998 | Dedrick |
| 5,790,935 A | 8/1998 | Payton |
| 5,794,210 A | 8/1998 | Goldhaber et al. |

(Continued)

FOREIGN PATENT DOCUMENTS

| | | |
|---|---|---|
| EP | 1235169 | 8/2002 |
| WO | 0135296 | 5/2001 |

OTHER PUBLICATIONS

"Notification Concerning Transmittal of International Preliminary Report on Patentability," corresponding to International Patent Application No. PCT/US2007/072237, 1 page, mailed Mar. 26, 2009.

(Continued)

*Primary Examiner* — Brian T Pendleton
*Assistant Examiner* — Jean D Saint Cyr
(74) *Attorney, Agent, or Firm* — Hanley, Flight & Zimmerman, LLC

(57) ABSTRACT

Methods and an apparatus for selecting and pushing customized electronic media content are disclosed. An example method includes determining a first capability associated with a first device; determining a second capability associated with a second device; segmenting a piece of media into a first plurality of portions according to the first capability; when the second capability is different from the first capability, segmenting the piece of electronic media into a second plurality of portions according to the second capability, the second plurality of portions to be sized differently than the first plurality of portions; pushing a first one of the first plurality of portions to the first media device prior to the user requesting the first piece of electronic media; and pushing a first one of the second plurality of portion to the second media device prior to the user requesting the first piece of electronic media.

18 Claims, 10 Drawing Sheets

(56) References Cited

U.S. PATENT DOCUMENTS

| | | | |
|---|---|---|---|
| 2002/0032905 A1* | 3/2002 | Sherr et al. .................... 725/38 |
| 2002/0055351 A1 | 5/2002 | Elsey et al. |
| 2002/0091568 A1 | 7/2002 | Kraft et al. |
| 2002/0133830 A1* | 9/2002 | Kim et al. .................... 725/142 |
| 2003/0100315 A1* | 5/2003 | Rankin .................... 455/456 |
| 2003/0115189 A1 | 6/2003 | Srinivasa et al. |
| 2003/0163646 A1* | 8/2003 | O'Neil .................... 711/137 |
| 2004/0029567 A1 | 2/2004 | Timmins et al. |
| 2004/0193484 A1 | 9/2004 | Allen |
| 2005/0004897 A1* | 1/2005 | Lipson et al. .................... 707/3 |
| 2005/0049917 A1 | 3/2005 | Fink |
| 2006/0059517 A1* | 3/2006 | Thelen et al. .................... 725/46 |
| 2006/0074769 A1 | 4/2006 | Looney et al. |
| 2007/0156677 A1* | 7/2007 | Szabo .................... 707/5 |
| 2012/0030565 A1* | 2/2012 | Kalra .................... 715/264 |

OTHER PUBLICATIONS

"International Preliminary Report on Patentability," corresponding to International Patent Application No. PCT/US2007/072237, 5 pages, issued Mar. 17, 2009.

International Search Report corresponding to International Application Serial No. PCT/US2007/072237, mailed Dec. 18, 2007, 5 pages.

Written Opinion corresponding to International Application Serial No. PCT/US2007/072237, mailed Dec. 18, 2007, 5 pages.

United States Patent and Trademark Office, Non-final Office Action issued in connection with U.S. Appl. No. 11/530,711, Sep. 4, 2008, 20 pages.

United States Patent and Trademark Office, Non-final Office Action issued in connection with U.S. Appl. No. 11/530,711, Apr. 17, 2009, 13 pages.

United States Patent and Trademark Office, Final Office Action issued in connection with U.S. Appl. No.11/530,711, Nov. 12, 2009, 15 pages.

United States Patent and Trademark Office, Non-final Office Action issued in connection with U.S. Appl. No. 11/530,711, Oct. 8, 2010, 15 pages.

United States Patent and Trademark Office, Final Office Action issued in connection with U.S Appl. No. 11/530,711, Mar. 10, 2011, 19 pages.

United States Patent and Trademark Office, Non-final Office Action issued in connection with U.S. Appl. No. 11/530,711, Oct. 6, 2011, 18 pages.

United States Patent and Trademark Office, Final Office Action issued in connection with U.S. Appl. No. 11/530,711, Feb. 29, 2012, 37 pages.

United States Patent and Trademark Office, Notice of Allowance and Fees Due issued in connection with U.S. Appl. No. 11/530,711, Dec. 21, 2012, 60 pages.

* cited by examiner

METHODS AND APPARATUS FOR SELECTING AND PUSHING CUSTOMIZED ELECTRONIC MEDIA CONTENT

RELATED APPLICATION

This patent arises from a continuation of U.S. patent application Ser. No. 11/530,711, filed Sep. 11, 2006, now U.S. Pat. No. 8,429,702, which is hereby incorporated herein by reference in its entirety. Priority to U.S. patent application Ser. No. 11/530,711 is claimed.

TECHNICAL FIELD

This disclosure relates generally to media distribution and, more particularly, to methods and apparatus for selecting and pushing customized electronic media content.

BACKGROUND

Using the Internet to distribute electronic media content to consumers continues to grow in importance, but in some instances data delivery throughput detracts from the user experience. For instance, limited data throughput may cause a waiting period for a user after a piece of electronic media is demanded. For example, a user may experience one or more buffering "freezes" during playback of electronic media when different portions of a demanded piece of electronic media content are downloaded in parallel and playback begins before the entire piece of electronic media content is downloaded. In other words, playback may temporarily stop (i.e., temporarily freeze) if the speed of the playback outpaces that of the download. Alternatively, a user may be compelled to wait before playback while an entire demanded piece of electronic media is downloaded. While the latter approach avoids playback freeze, it requires a longer time between a request for the electronic media and playback of the electronic media. In each of the above examples, the user's experience of both the demanded content and the Internet data delivery system is impaired.

The increasing data rates of broadband wide-area networks have enabled users to access television programming using Internet protocol television (IPTV) services. However, when available bandwidth of the broadband wide-area network is limited, the user experience may be negatively impacted by delivery delay and/or playback freezing, as explained above. The situation in the IPTV context is further complicated by the fact that devices of widely varying capabilities may be used for IPTV playback. For example, these devices and/or the communication networks that deliver data to these devices may differ in bandwidth.

DETAILED DESCRIPTION

Figure 1:
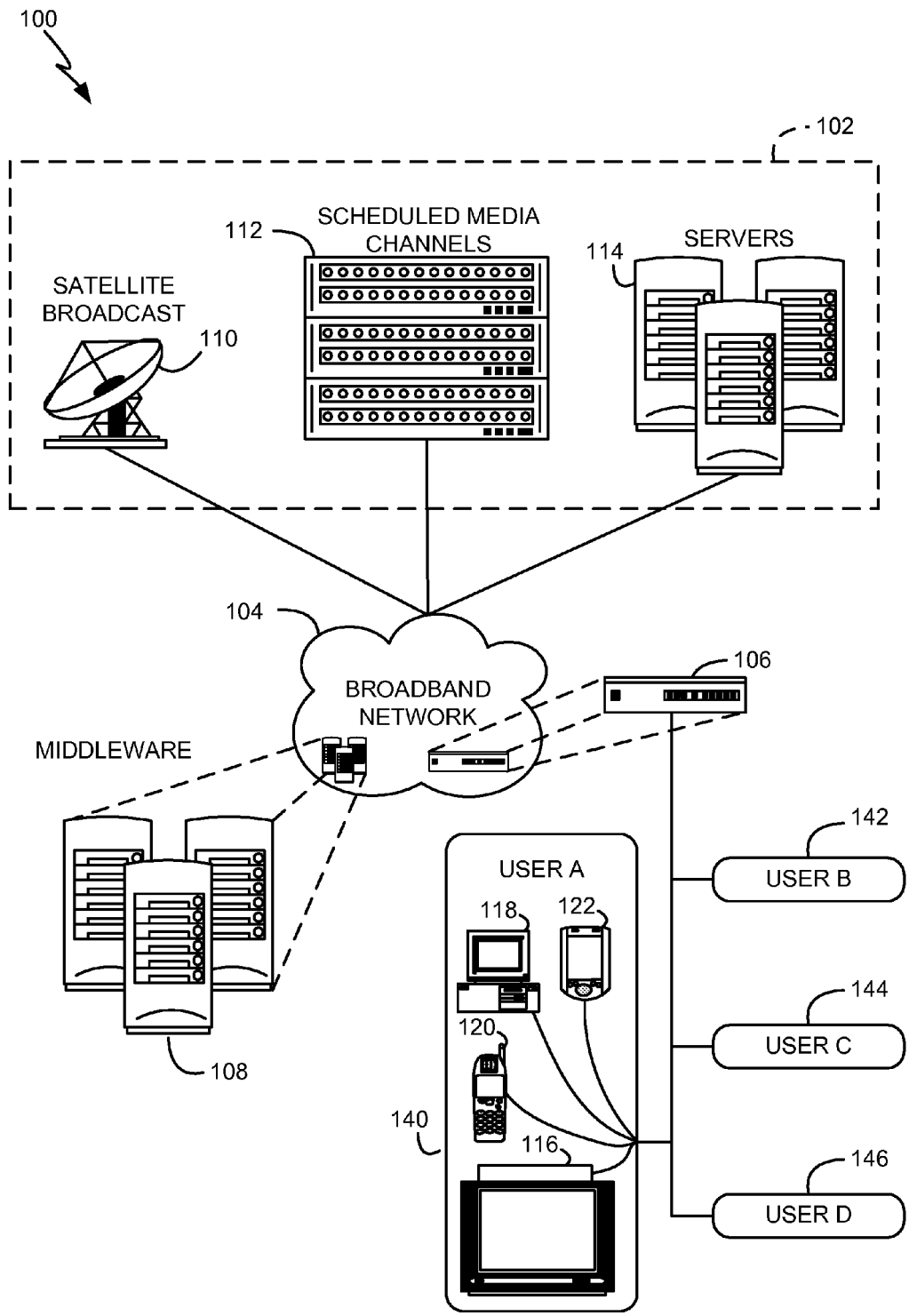
FIG. 1 is a schematic illustration of an example electronic media delivery system.

An example electronic media delivery system 100 to provide electronic media content (e.g., IPTV content, electronic audio content, streaming video content, etc.) is illustrated in FIG. 1. The example system 100 of FIG. 1 is shown integrated in a low to medium bandwidth system that, absent corrective measures, exhibits playback freeze and/or delivery delay as explained above. To avoid such adverse user experiences, the example system 100 of FIG. 1 is structured to automatically select electronic media content for one or more users based on one or more criteria, to determine the storage capabilities of the user device(s) associated with the one or more users, and to automatically download (i.e., push or preload) at least a portion of the selected content to the one or more user devices associated with the respective users. The portion of the selected content downloaded to the one or more users is selected based on the storage capacit(ies) of the one or more user device(s). Because the content is preloaded prior to a request for the content from the user, the content is immediately available to the user when it is requested, and the issues of playback freeze and playback delay are avoided for that content.

The example electronic media content selected and pushed to the user(s) can include one or more types of content formats (e.g., video, audio, multimedia, etc.) using any known or future compression and/or coding approaches (e.g., MPEG-1, MPEG-2, H.264, etc.). The electronic media content may include any type of content (e.g., sports programming, weather programming, news broadcasts, movie broadcasts, local interest information, advertising, etc.). The user devices may be any type of electronic device capable of receiving electronic media content such as televisions, television set-top-boxes, mobile set-top-boxes, personal computers (e.g., x86 compatible, Apple® compatible), mobile phones, wireless communicators (e.g., personal digital assistants), portable media players (e.g., mobile video players, portable MP3 players), and/or kiosks.

The example electronic media delivery system 100 of FIG. 1 automatically selects and/or pushes electronic media content to one or more user devices based on one or more criteria or selection factors. For example, electronic media content may be selected based on a current geographic location of the user, a future geographic location of the user, prior behavior of a user (e.g., historical Internet searches, media downloads, etc.), a demographic characteristic (e.g., age, income, ethnic origin, etc.) of the user, and/or a psychographic characteristic (e.g., attitudes, political affiliations, aspirations, etc.) of the user. After identifying content of interest to the user(s), the example system 100 of FIG. 1 selects at least a first portion of the identified content to be downloaded to the user(s) based on one or more technical capabilities (e.g., storage capacity) of the user device(s) and then downloads that portion of the identified content. The system 100 may download one or more additional portions of the identified content at a later time. These subsequent download(s) can over-write the prior portion(s) of the content pushed to the user device(s), under the assumption that the prior content was not of interest or is no longer of interest to the user. The subsequent download(s) can occur at periodic intervals (e.g., once per day, once every 12 hours, etc.) or can occur in response to a request from a user.

The example electronic media delivery system 100 of FIG. 1 is particularly useful for selecting and pushing electronic media content to geographically mobile users. For example, a user intending to travel or currently traveling may desire to receive content that is individualized to the user's geographic destination. Alternatively or additionally, the user may desire content that is lengthy in duration of playback for consumption on a transportable media player during travel (e.g., while on a plane, train, etc). As another example, a traveling user may desire content such as news broadcasts or local advertisements for the user's future geographic destination to be downloaded to a mobile device associated with the traveling user prior to the user reaching the future geographic destination. Such pre-loading of individualized content avoids playback freeze and/or download delays by ensuring content of interest is available for consumption prior to the desired consumption time.

Turning to FIG. 1, the example electronic media delivery system 100 includes a plurality of media sources 102. The media sources 102 are connected to a broadband network 104 that communicates data to one or more users 140-146 based on one or more protocols. The example media sources 102 depicted in the example electronic media delivery system 100 of FIG. 1 include a satellite broadcast source 110, a scheduled media source 112 that may deliver media content via one or more channels (e.g., an IPTV source), and a media on-demand source 114 that may deliver media content in response to a user request (i.e., demand for the media content). Although the example electronic media delivery system 100 of FIG. 1 is illustratively shown with a single network, the example network 104 may be implemented by one or more networks (e.g., a local-area network, a wide-area network, a metropolitan-area network, the Internet, a digital subscriber line (DSL) network, a cable network, a power line network, a wireless communication network, a wireless mobile phone network, a Wi-Fi network, and/or a satellite network). Further, although the network 104 is referred to as "broadband", it may provide any level of bandwidth to any number of users. In the illustrated example the network 104 is meant to represent any network or collection of networks that could suffer from playback freeze or any other undesirable playback delays. Thus, in this context, the broadband network 104 may be implemented by one or more networks that provide low to medium levels of bandwidth, and/or one or more very-high bandwidth networks that service one or more low to medium networks and/or one or more low to medium bandwidth devices.

The example media delivery system 100 of FIG. 1 includes an example switch 106 to transfer electronic data between a particular client and server. The example switch 106 is capable of a plurality of operations. For instance, the example switch 106 can cause electronic data to be sent to or from a client and/or server via the network 104. Although only one example switch 106 is shown in FIG. 1, the example media delivery system 100 of FIG. 1 is implemented with a plurality of switches, some of which may perform operations different from others (e.g., media source selector switches, network selector switches, routers, etc).

In the example electronic media delivery system 100 of FIG. 1, the example user 140 has a plurality of example devices 116-122. Similar to the example user 140, the example users 142-146 within the example electronic media delivery system 100 may have one or more respectively associated devices (not shown). The example devices 116-122 associated with the example user 140 include a television set-top-box 116, a personal computer 118, a personal digital assistant and/or MP3 player 122, and/or a cell phone 120, but one or more additional or alternative devices (e.g., a mobile set-top-box, a mobile video player, a portable MP3 player, kiosks, etc.) may be associated with the example user 140 and/or with any of the other users 142-146. Some or all of the example user devices 116-122 can transfer content stored on the user device to a second device for playback of the stored content. For example, a mobile set-top-box (e.g., cell phone 120) can be implemented to display stored content on a television or computer monitor.

The example devices 116-122 of FIG. 1 vary in attributes. For example, the devices 116-122 may vary in one or more performance attributes (e.g., storage capacity, processing speed, and/or data storage access latency). The devices 116-122 may also vary in attributes due to their association with different communication networks within the example electronic media delivery system 100. For example, the set-top-box 116 may connect to the broadband network 104 via a digital subscriber line, and the personal digital assistant 122 may connect to the broadband network 104 via a wireless connection. The digital subscriber line and the wireless connection may vary in throughput, and thus the effective bandwidths to the set-top-box 116 and personal digital assistant 122 may likewise vary. For instance, the bandwidth of the set-top-box 116 may be much higher than the bandwidth of the personal digital assistant 122.

In the example electronic media delivery system 100 of FIG. 1, each of the example user devices 116-122 of the example user 140 has one or more identifiers to distinguish the respective example user devices 116-122 from one another and from other devices, thereby enabling one-to-one communication. For example, each device may be assigned a unique alpha-numeric identifier (e.g., a byte address, an Internet Protocol (IP) Address, a Mobile Identification Number, etc.). The plurality of identifiers respectively associated with the devices of a particular example user 140-146 can be identified in a single data record as explained below. The single record may comprise, for example, a user name, user number, and/or other unique identifier.

The example electronic media delivery system 100 of FIG. 1 includes a plurality of middleware devices 108, which provide tools to administer and distribute electronic data within the example electronic media delivery system 100. The example middleware devices 108 of FIG. 1 are implemented by one or more servers such as, for example, application servers, database servers, file servers, etc. Additionally, the example middleware devices 108 of FIG. 1 contain a variety of databases such as, for example, mainframe databases, client-server databases, and/or any other electronic store of data supported on any memory device (e.g., removable media disk drives, hard disk drives, network drives). The middleware devices 108 of FIG. 1 are shown within the broadband network 104 and implement a plurality of nodes within the example broadband network 104. The plurality of nodes can be centralized within an example national headend of the example broadband network 104 or geographically dispersed throughout the example broadband network 104. One or more of the example middleware devices 108 of FIG. 1 are configured as an example content selector 108 to select and/or push one or more pieces of electronic media content to one or more user devices 116-122.

Figure 2:
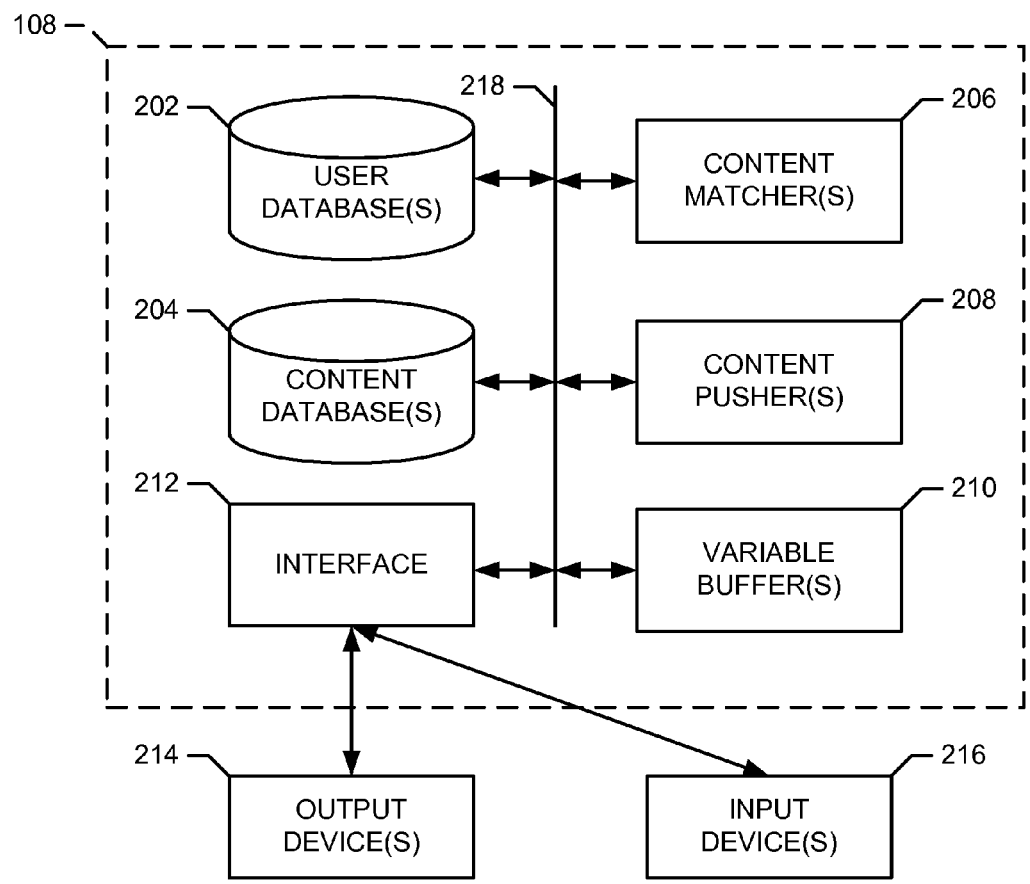
FIG. 2 is a schematic illustration of an example content selector.

FIG. 2 depicts an example content selector 108 from FIG. 1 in greater detail. The example content selector 108 of FIG. 2 includes an example user database 202 to store user data structures, an example content database 204 to store content data structures, an example content matcher 206 to compare entries in the user data structures to entries in the content data structures to select media content for pushing to users, a content pusher 208 to push some or all of the media content selected by the content matcher 206, a variable buffer 210 to store some or all of the media content selected by the content matcher 206, and an interface circuit 212. The example user database 202, the example content database 204, the example content matcher 206, the content pusher 208, the variable buffer 210, and the interface circuit 212 of the illustrated example are configured to communicate via a common communication interface 218, which may employ common applications, protocols, networks, and/or hardware. In the example of FIG. 2, the example interface 212 provides hardware and/or software such as, for example, a data link layer of a wired Ethernet or any other suitable physical connection, to enable the content selector 108 to communicate via any current or future standard for communicating electronic data with one or more input devices 214 and/or output devices 216. The example input devices 214 and/or the output devices 216 of FIG. 2 may be, for example, the example media sources 102 and/or the example user devices 116-122 of FIG. 1.

The example user database 202 of the example content selector 108 of FIG. 2 stores a plurality of user data structures. Each of the user data structures associates a particular user (e.g., the example user 140 of FIG. 1) with one or more data objects representative of characteristics of the particular user. In the illustrated example, the data objects within the example user database 202 textually describe one or more characteristics of a particular user. Persons of ordinary skill in the art will understand that such textual descriptions can alternatively or additionally be implemented by codes and/or other designations. The user data structures may be implemented using, for example, a look-up table, a relational database, or any other suitable structure for storing data. The example user database 202 may comprise a removable media disk drive, a hard disk drive, a network drive, and/or any other suitable storage device. The characteristics represented as data objects in the example user data structure may include, for example, a current geographic location associated with a particular user, a history of website information demanded by a particular user (e.g., a log of uniform resource locators ("URLs") from a browser, a log of data from a browser, etc.), a history of web search values associated with a particular user, demographic characteristics of a particular user, and/or psychographic characteristics of a particular user. Additionally, the data objects in the example user data structure may include the device identifiers associated with a user device, a storage capacity of the user device, a media content compatibility of the user device, a current geographic location of the user device, performance attributes of the user device, performance attributes of the network associated with the user device, etc.

To acquire additional data objects for a particular user (e.g., the example user 140 of FIG. 1), the example user database 202 employs the example interface circuit 212 to communicate through a common network (e.g., the example broadband network 104 of FIG. 1) with one or more input devices 216 associated with that particular user. For example, data objects associated with a current or future geographic location (e.g., city name, airplane flight number, travel itinerary, etc.) which can be used to predict a future geographic location of the user during a given period of time may exist within an electronic calendar. One or more of the input devices 216 (e.g., user devices 116-122) may include or be associated with such an electronic calendar (e.g., client calendar software, client-server calendar software, etc.). Alternatively or additionally, one or more of the input devices 216 may be implemented by an application server (e.g., an email server, an exchange server, etc.), which operates client-server software and stores such an electronic calendar for a particular user (the calendar and user may be identified, for instance, by one or more user identifiers (e.g., a username and/or password, etc.)). Therefore, to enable identification of current and/or future geographic locations of a user, the example user database 202 of the illustrated example interacts with the input device(s) 216 to create and/or populate data objects with data polled from the electronic calendar for a corresponding user.

The example interface circuit 212 of FIG. 2 enables users to access one or more designated data structures within the example user database 202. To this end, the example user database 202 of FIG. 2 includes one or more example authentication mechanisms and/or protocols to authenticate a particular user seeking to access the example user database 202. Example mechanism(s) and/or protocol(s) that can be employed by the example user database 202 include requiring entry of a unique identifier and password associated with a particular data structure, and/or using a user device having an electronic identifier uniquely associated with that data structure or the user associated with that data structure. After authenticating the example user, the example user database 202 of FIG. 2 enables the authenticated user to provide, delete, and/or change one or more data objects representative of one or more characteristics within the example user database 202 to customize the user data structure. For example, a user may enter a location (e.g., a network address) and/or access permissions (e.g., an associated username and/or password) in the example user data structure 202 to enable the content selector 108 to automatically access and/or poll the user's electronic calendar for data relevant to identifying and/or predicting current and/or future geographic locations of the user.

Figure 3:
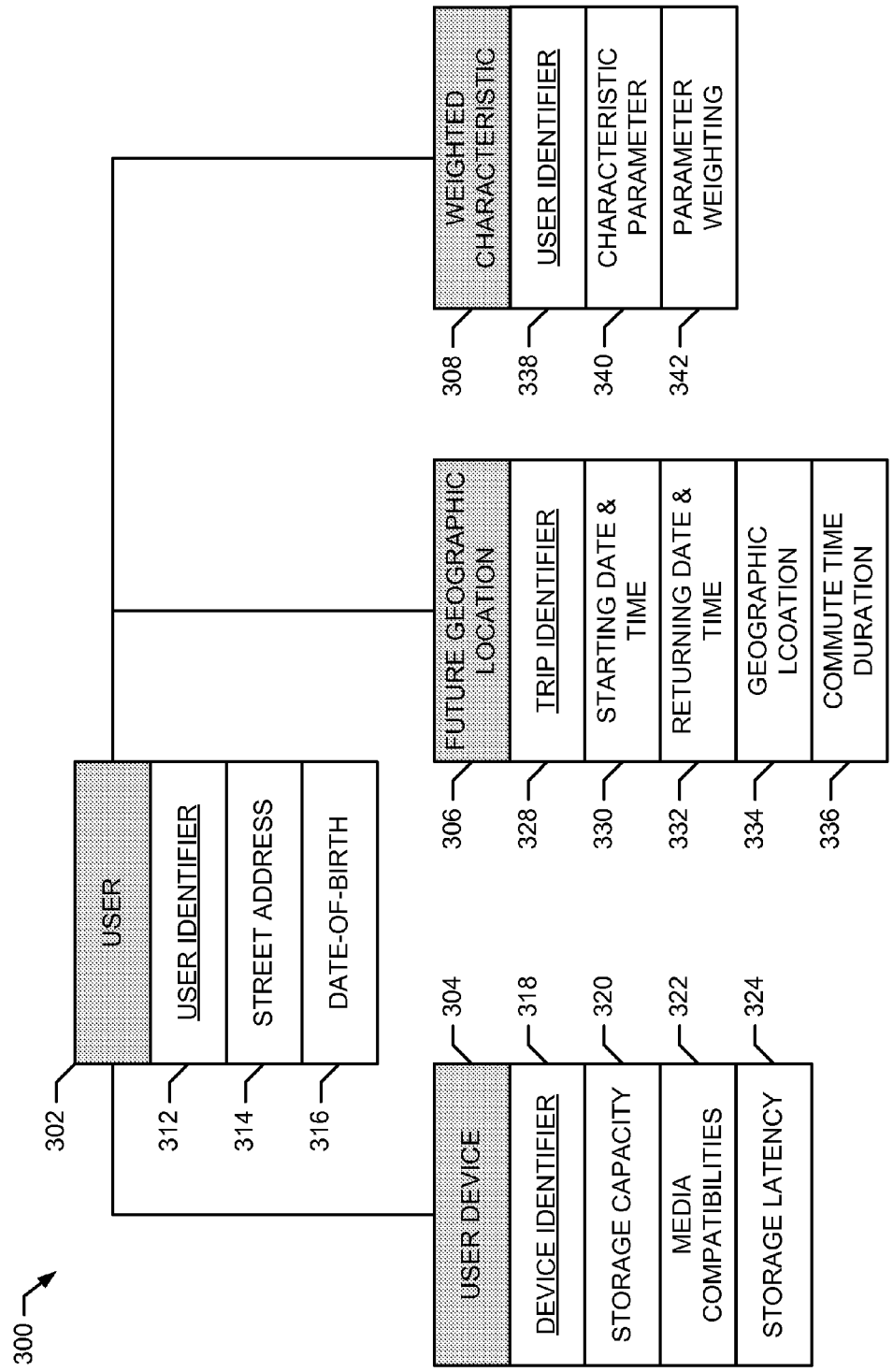
FIG. 3 illustrates an example user data structure, which may be accessed by the example content selector of FIG. 2.

FIG. 3 depicts an example user data structure 300 stored in the example user database 202 of FIG. 2. The example user data structure 300 of FIG. 3 contains a number of tables. In particular, the user data structure 300 of FIG. 3 includes an example user table 302, an example user device table 304, a future geographic location table 306, and a weighted characteristics table 308. Each table includes one or more field(s) to store one or more data objects. The tables may be implemented in any desired manner. For example, the tables may include tags to offset the fields (e.g., an XML Information Set, etc.).

The example user table 302 of FIG. 3 includes a user identifier field 312, a street address field 314, and a date-of-birth field 316. For an example user, such as the example user 140 of FIG. 1, the example user table 302 holds a user identifier such as "johndoe" in the user identifier field 312, a physical address such as "123 Main St Dallas Tex." in the street address field 314, and a date such as "01011950" in the date-of-birth field 316.

In the illustrated example, the example user "johndoe" has a first example user device (e.g., the personal digital assistant 122 of FIG. 1). Thus, the example data structure 300 of FIG. 3 includes an example user device table 304 representative of that device. The example user device table 304 of FIG. 3 contains a device identifier for the first user device such as "johndoe122" in the device identifier field 318, a value representation of the user device storage capacity such as "512 MB" in the storage capacity field 320, a value representative of the content formats compatible with the user device such as "MWAT" (e.g., MPEG, WMV, AVI, TXT) in the media compatibilities field 322, and a value representative of upper and lower expected storage latencies of the user device "0.7/1.5 ms" in the storage access latency field 324. Additionally, in the example of FIG. 3, the user "johndoe" has a second example user device (e.g., the television set-top-box 116 of FIG. 1). Thus, the example data structure 300 of FIG. 3 includes a second table (not shown, but identical to table 304) that contains a second device identifier for the second user device such as "johndoe116" in a device identifier field, a value representation of the second user device storage capacity such as "4096 MB" in the storage capacity field, a value representative of the content formats compatible with the second user device such as "MT" (e.g., MPEG, TXT) in the media compatibilities field, and a value representative of an upper and lower expected storage latencies of the second user device "0.7/1.5 ms" in the storage access latency field.

For the purpose of tracking the geographic location of the user, the example data structure 300 of FIG. 3 also includes a future geographic location table 306. In the example of FIG. 3, the future geographic location table 306 includes a trip identifier field 328, a starting date and time field 330, a returning date and time field 332, a geographic location field 334, and a commute time duration field 336. In the illustrated example, the future geographic location table 306 includes a trip identifier such as "johndoe1" in the trip identifier field 328, a date such as "02022020" in the starting date and time field 330, a second date such as "02052020" in the returning date and time field 332, a physical location such as "Austin" in the geographic location field 334, and a value representation of time (e.g., hours) such as "02:30" in the commute time duration field 336.

The user data structure 300 may include additional or alternative fields to those shown in FIG. 3. For example, it may includes one or more fields to store a list of search terms recently used by a user to perform an Internet search, to store a list of media titles recently requested by the user, to store a list of URLs recently visited by the user, to store a list of actors in content historically viewed by the user, to store a list of hobbies or special interests of the user, etc. Some or all of these fields may contain data to facilitate keyword searching for media content of interest to the corresponding user The example user data structure 300 of FIG. 3 also includes a weighted characteristics table 308, which includes a user identifier field 338, a characteristic parameter field 340, and a characteristic parameter weighting field 342. The characteristic parameter field 340 contains a data object that abstracts one or more fields 312-336 within the example data structure 300 to create one or more characteristic parameters (e.g., one or more values corresponding to one or more characteristics of a particular user that can be matched against data representative of attributes of electronic media content). The characteristic parameters may include data that is a one-to-one abstraction of a respective field in the user data structure 300 (e.g., an age with the birth date field 316) and/or may include data that is a one-to-many abstraction of a plurality of fields in the user data structure 300 (e.g., a future geographic location with the starting date and time field 330, the returning date and time field 332, the geographic location field 334, and the commute time duration field 336). In the example data structure 300 of FIG. 2, the characteristic parameter is a pointer to certain data objects describing certain characteristics of a particular user that will be used for content matching for that user, for example, a pointer to one or more field(s) 312-336 of FIG. 3. The characteristic parameter weighting field 342 of the illustrated example contains weighting variables ($u_i$), which are one or more quantifiable weighting value assigned to one or more characteristic parameters (i) associated with a user or media content attribute. In the illustrated example, the weighting variable ($u_i$) is a set of quantifiable weighting values assigned to respective characteristic parameters or to respective media content attributes for use in identifying media content of interest to the corresponding user.

As previously discussed, the example interface circuit 212 enables users to access one or more designated data structures and/or portions of data structures stored within the example user database 202. For example, after being authenticated, the authenticated user can change one or more of the characteristic parameters and/or one or more of the weighting variables within the example user database 202. For example, the authenticated user may increase the value of a first weighting variable associated with a first characteristic parameter and decrease the value of a second weighting variable associated with a second characteristic parameter. As a result of these changes to the values of the first and second weighting variables, the weight assigned to the first characteristic parameter is increased and the weight assigned to the second characteristic parameter is decreased during subsequent attempts to match content to users. Similarly, the authenticated user can add a new characteristic parameter with a new weighting variable in the example weighted characteristics table 308, or remove an existing characteristic parameter and/or an existing weighting variable from the example weighted characteristics table 308.

Figures 4, 5:
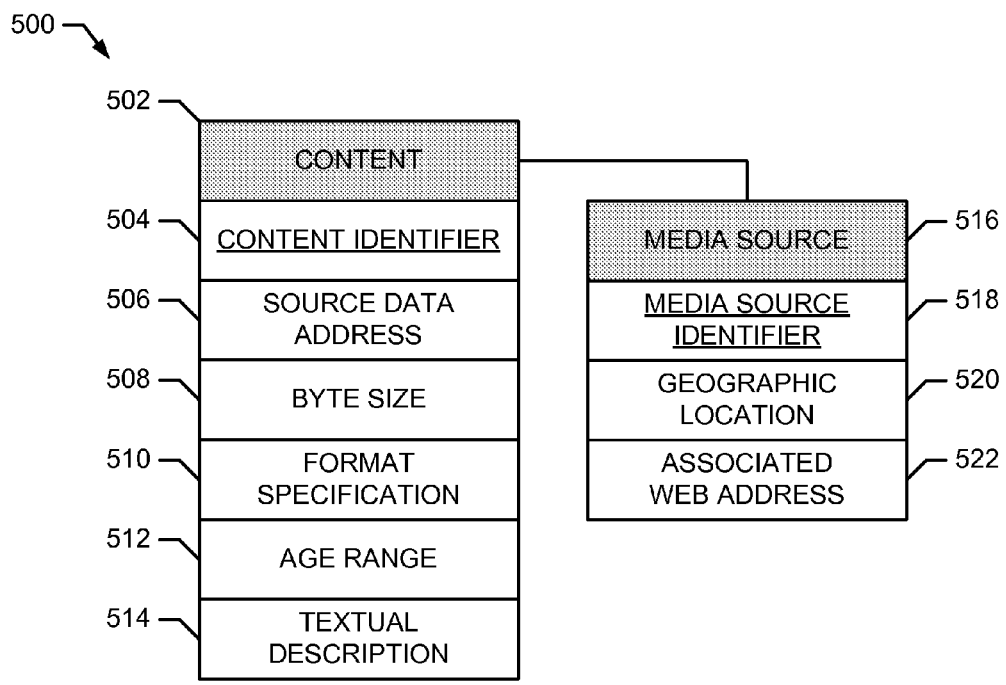
FIG. 4 illustrates an example table in the example user data structure of FIG. 3.
FIG. 5 illustrates an example content data structure, which may be accessed by the example content selector FIG. 2.

FIG. 4 illustrates the example weighted characteristic table 308 of FIG. 3 in more detail for the example user "johndoe". In the example of FIG. 4, the weighted characteristic table 308 holds a first record 400, a second record 402, and a third record 404. The first record 400 contains the user identifier "johndoe" in the user identifier field 338, a first characteristic parameter "age" (1) in the characteristic parameter field 340, and a weighting variable having a value of "20" (i.e., $u_1:=20$) in the parameter weighting field 342. The second record 402 contains the user identifier "johndoe" in the user identifier field 338, a second characteristic parameter "current geographic location" (2) in the characteristic parameter field 340, and a second weighting variable having a value of "20" (i.e., $u_2:=20$) in the parameter weighting field 342. The third record 404 contains the user identifier "johndoe" in the user identifier field 338, a third characteristic parameter "future geographic location" (3), and a third weighting variable with a value of "60" (i.e., $u_3:=60$) in the parameter weighting field 342. In the illustrated example, the weighting variables may be expressed in vectorized form, where a set of weighting variables (e.g., the weighting variables associated with a single user) form a weighting vector (U) and each weighting variable is a vector element ($u_i$) (i.e., $U:=(u_i)_n$). For instance, in the example of FIG. 3, a weighting vector for the example user "johndoe" may be expressed as $U_1:=(20,20,60)$ where each vector element is normalized such that the sum of the vector elements in the weighting vector is one hundred.

As mentioned above, the example content database 204 of the example content selector 108 of FIG. 2 stores a plurality of content data structures. Each of the content data structures associates a particular piece of electronic media content with metadata about that piece of electronic media content. The metadata describe particular features/attributes of the corresponding piece of electronic media content to aid in the matching electronic media content to users interested in the same. The metadata in the content data structures may include an address (e.g., a geographic address, a byte address, etc.) of a media source, a textual subject description (e.g., movie title, genre, starring actors, parental guidance ratings (e.g., TV14, PG-13, etc.), audience ratings, demographic classifications, psychographics classifications, geographic affiliations, etc.) of the piece of electronic media content, a size description of the piece of electronic media content (e.g., bit rate, length, storage size, etc.), a format specification (e.g., MP3, AVI, WMV, MPEG, etc.) of the example piece of electronic media content. Additionally or alternatively, the metadata in the content data structure may include intellectual property rights information (e.g., owners, agents, permitted usage domains, distribution restrictions) and/or pricing information.

The content data structures may be implemented using a look-up table, a relational database, or any other suitable structure for storing data. The content database 204 may comprise a removable media disk drive, a hard disk drive, a network drive, and/or any other suitable storage device. The content database 204 can be populated by interacting with one or more input devices 216 such as database servers, webpage servers, etc. that store metadata about electronic media content via the interface circuit 212. Further, the characteristic parameters of the user data structures discussed above may be logically linked with one or more fields in the content data structure, and/or stored in a string format (e.g., characters, words, phrases) to provide character matching between the data objects in the user data structure and the content data structure.

FIG. 5 depicts an example content data structure 500 stored in the example content database 204 of FIG. 2. The example content data structure 500 of FIG. 5 contains a number of tables. In particular, the content data structure 500 of FIG. 5 includes an example content table 502 and an example media source table 516. Each table includes one or more field(s) to store one or more data objects. The tables may be implemented in any desired manner. For example, the tables may include tags to offset the fields (e.g., an XML Information Set, etc.).

The example content table 502 of FIG. 5 includes a content identifier field 504, a source data address field 506, a byte size field 508, a format specification field 510, an age range field 512, and a textual description field 514. For a given piece of electronic media content, the example content table 502 contains a corresponding content identifier such as "video1" to uniquely identify the piece of electronic media content in the content identifier field 504, a value representative of the stored location of the piece of electronic media content such as an "1.1.1.1" in the source data address field 506, a value representative of the byte size of the piece of electronic media content such as "10 MB" in the byte size field 508, a value representative of the format of the piece of electronic media content such as "MPEG" in the format specification field 510, a value representative of a target audience member age range for the material such as "18-27" in the age range field 512, and a textual description of the piece of electronic media content such as "restaurant review television Texas" in the textual description field 514. In the example of FIG. 5, the example media source table 516 contains a value representative of the media source (e.g., television broadcaster, distributor, publisher, etc.) such as "PBS20", a value representative of the geographic location of the media source such as "Austin" in the geographic location field 520, and a web address for the media source such as "www.pbs20.com" in the associated web address field 522.

As shown in FIG. 5, at least some of the metadata is logically associated to the characteristic parameters stored in the user data structures. For example, the "age" characteristic parameter (1) of FIG. 4 is matched with the age range field 512 of FIG. 5. The "current geographic location" characteristic parameter (2) of FIG. 4 is matched with the geographic location field 520 and the textual description field 514 of FIG. 5. Similarly, the "future geographic location" characteristic parameter (3) of FIG. 4 is matched with the geographic location field 520 and the textual description field 514 of FIG. 5.

Using character matching, or any similar such algorithm to compare data objects, the data objects of the example user data structure 300 and the metadata of the example content data structure 500 can be matched. Similarly, if the user data structure includes fields storing a list of search terms recently used by a user to perform an Internet search, a list of media titles recently requested by the user, a list of URLs recently visited by the user, a list of actors in content historically viewed by the user, a list of hobbies or special interests of the user, etc. (hereinafter keywords), the keywords in those fields can be used to perform a keyword search against the textual description field 514 and/or other fields of the content data structures.

The example content selector 108 of FIG. 2 further includes an example content matcher 206 to select one or more pieces of electronic media content for pushing to one or more users. More specifically, for a particular user, the example content matcher 206 obtains the stored characteristic parameters from the characteristic parameter field 340 of FIG. 3 and the weighting variables from the characteristic parameter weighting field 342 of FIG. 3. As discussed above, the characteristic parameter is a pointer to certain data objects in the content data structure. As directed from these characteristic parameters, the example content matcher 206 obtains particular data objects from the content data structure. Using the obtained data objects, the example content matcher 206 searches the example user database 202 for matching content data structures.

In particular, the content matcher 206 compares the obtained data objects from the user data structure with metadata from the content data structure and determines the matches between the data objects from the example user data structure in question and the metadata from the example content database 204. A match may be exact (e.g., both the data objects and the metadata have the same value) such as, for example, a string "Austin" or a match may be inexact, but related, (e.g., the string "Austin" may match with "Texas", "University of Texas", "Longhorns", "Colorado River", "TX", etc). Where the metadata is a coded, such as a numerical range (e.g., "20-29"), the content matcher 206 evaluates the coded metadata with a data object (e.g., "25" is within "20-30"). The example content matcher 206 generates a match variable ($c_i^j$), whose value demonstrates a match between characteristic parameter(s) (i) of the user in question and the metadata of a piece of electronic media content (j).

The value of the match variable is computed by quantifying the matches between data objects from the example user database 202 and the metadata from the example content database 204. For example, the content matcher 206 generates a value from the ratio of the number of matched keywords and a total number of possible matches for a piece of electronic media content. Similarly, where the metadata is a coded, such as a numerical range (e.g., "20-29"), the content matcher 206 can evaluate the total number of possible matches for a piece of electronic media content (e.g., nine possible matches within the numerical range "20-29"). Alternatively or additionally, the content matcher 206 may discretely evaluate a match between data objects from the user database 202 and the metadata from the example content database 204 such as, either data objects entirely match or do not match the metadata. As detailed below, each match variable ($c_i^j$) generated by the example content matcher 206 is weighted by a respective weighting variable ($u_i$) from the characteristic parameter weighting field 342 of FIG. 3.

Considering the example of FIGS. 3-5, the example content matcher 206 obtains the characteristic parameters and the weighting variables for the example user "johndoe" from the example weighted characteristic table 308 of FIG. 4. Based on the pointers of the characteristic parameters, the example content selector 206 obtains the designated data objects from the example user database 202 of FIG. 2. The example content matcher 206 also obtains the metadata for an example first piece of electronic media content in the example content database 204. The acquired metadata is obtained from the fields of the content data structure from the example content database 204 of FIG. 2 associated with the characteristic parameters. For instance, if the "age" characteristic parameter (1), "the current geographic location" characteristic parameter (2), and the "future geographic location" characteristic parameter (3) of FIG. 4 of the example user are used for content selection, then the metadata stored in the age range field 512, the textual description field 514, and the geographic location field 520 are matched.

For example, the content matcher 206 obtains the coded data object from the date-of-birth field 316 of FIG. 3 that corresponds to an age value of "20". The example content matcher 206 compares the age value of "20" with the numerical range "18-27" from the age range field 512 of FIG. 5, and determines the age value matches one-of-ten possible matches from the numerical age range "18-27". Thus, the example content matcher 206 generates a match value of "0.1" (i.e., $c_1^1 := 1/10 = 0.1$) associated with the "age" characteristic parameter (1) of FIG. 4. Similarly, the example content matcher 206 obtains the data object "123 Main St Dallas Tex." from the street address field 314 of FIG. 3 for the "current geographic location" characteristic parameter (3) of FIG. 4. The content matcher 206 matches a first keyword of "Texas" of the four keywords from the textual description field 514 and a second keyword of "Austin" of the one keyword from the geographic location field 520 of FIG. 5. Thus, the example content matcher 206 generates a match value of "0.4" (i.e., $c_2^1 := 2/5 = 0.4$) associated with the "current geographic location" characteristic parameter (2) of FIG. 4. Additionally, the example content matcher 206 obtains the data object "Austin" from the geographic location field 334 of FIG. 3 for the "future geographic location" characteristic parameter (3) if FIG. 4. The content matcher 206 matches a first related keyword of "Texas" of the four keywords from the textual description field 514 and a second keyword of "Austin" of the one keyword from the geographic location field 520 of FIG. 5. Thus, the example content matcher 206 generates a match value of "0.4" (i.e., $c_3^1 := 2/5 = 0.4$) associated with the "future geographic location" characteristic parameter (3) of FIG. 4.

As shown above, the example content matcher 206 generates match values of "0.1", "0.4", and "0.4" (i.e., $c_1^1 := 0.1$, $c_2^1 := 0.4$, $c_3^1 := 0.4$) for the respective first, second, and third user characteristic parameters of the example user "johndoe" of FIG. 3 to the metadata of a first piece of media content. Further, assume for purpose of illustration, that the example content matcher 206 generates match variables of "0.6", "0.6", and "0.4" (i.e., $c_1^2 := 0.6$, $c_2^2 := 0.6$, $c_3^2 := 0.4$) respectively corresponding to the first, second, and third characteristic parameters of the example user "johndoe" relative to the metadata of a second piece of electronic media content. As can be seen by comparing the first match variables of the first and second piece of electronic media content (i.e., comparing $c_1^1$ to $c_1^2$), the example second piece of electronic media content is a better match in the "age" (1) characteristic parameter for the example user "johndoe" than the first piece of electronic media content.

To facilitate matching, weighting, and/or content selection, the match variables may be expressed in vectorized form, where a set of match variables associated with a piece of electronic media content form a content vector (C). Under this approach, each match variable is a vector element ($c_i$) (i.e., $C := (c_i)_n$). Thus, in the above example, the content matcher 206 creates a first content vector $C_1 := (0.1, 0.4, 0.4)$ for the example first piece of electronic media content, and a second content vector $C_2 := (0.6, 0.6, 0.4)$ for the example second piece of electronic media content.

To determine which of the first or second media content is a better match for the user of intent (e.g., "johndoe"), the example content matcher 206 combines the plurality of match variables with respective ones of the plurality of weighting variables, to generate an aggregated score. The example content matcher 206 selects the associated piece(s) of electronic media content with the highest aggregated score(s) for pushing to the user. In the illustrated example, the example content matcher 206 generates the aggregated score by computing a dot product of a weighting vector and a content vector (i.e., $U \cdot C$) associated with a particular user and a particular piece of electronic media content. Continuing with the example in the previous paragraph and using the weighting variables for the example user "johndoe" of FIGS. 3-4, the content matcher 206 generates the dot product of the weighting vector $U_1 := (20, 20, 60)$ and the first content vector $C_1 := (0.1, 0.4, 0.4)$ for the first piece of electronic media content. Similarly, the content matcher 206 generates a dot product of the weighting vector $U_1 := (20, 20, 60)$ and the second content vector $C_2 := (0.6, 0.6, 0.4)$ for the second piece of electronic media content. The example content matcher 206 then compares the aggregated scores (i.e., the dot products associated with the first and second content vectors). Because, in this example the dot product associated with the first piece of electronic media content (i.e., $U_1 \cdot C_1 = 34$) exceeds the dot product associated with the second piece of electronic media content (i.e., $U_1 \cdot C_2 = 48$), the second piece of electronic media content is identified by the example content matcher 206 as a more likely candidate for pushing to the user "johndoe" than the first piece of media content. In this manner, a list of the media content ranked from highest to lowest aggregated score can be generated by the content matcher 206, for use by the content pusher 208 in determining which content to push to the user (e.g., "johndoe" of FIG. 3).

Although in the above example, the content matcher 206 generated aggregate scores (e.g., dot products) for all available content vectors (i.e., all available pieces of electronic media content), the content matcher 206 may be implemented to compute aggregate scores for only a subset of the available content, thereby decreasing computational overhead of the content selector 108. The subset of content can be selected based on any number of conditions and/or functions. For instance, the subset may be selected by identifying content vectors having one or more match variables that exceed a predetermined threshold value, and/or it may select content vectors having match variables whose sum exceeds a value.

As mentioned above, the example content selector 108 of FIG. 2 further includes a content pusher 208. The example content pusher 208 of FIG. 2 is capable of selecting and pushing one or more selected pieces of electronic media content to a one or more user devices (e.g., any or all of devices 116-122) associated with a particular user (e.g., 142). As explained further below, the content pusher 206 selects the content to be pushed from the list of media content ranked by aggregated scores generated by the content matcher 206 based on the capabilities of the user's device(s). In the illustrated example, the example content pusher 208 pushes content to a user device (e.g., one or more of the example user devices 116-122 of FIG. 1) within a broadband network (e.g., broadband network 104 of FIG. 1) via the example interface 212. The example content pusher 208 of FIG. 2 pushes content to the user device on an aperiodic basis (e.g., based on event-based procedure(s), etc.), a periodic basis (e.g., based on scheduled procedure(s), etc.), a real-time basis, etc. The content pusher 208 of FIG. 2 may push content in groups (i.e., a first portion at a first time, a second portion at a second time, etc.). The groups may be sent at any desired interval (e.g., one group per day, one group per week, etc.) and may over-write prior groups, depending on the physical storage capabilities of the user device in question As discussed above, the example user database 202 enables the example content pusher 208 of FIG. 2 to access data objects associated with a particular user device (e.g., the example fields 318-324 of the user device table 304 from FIG. 3). The example content database 204 also enables the example content pusher 208 to access the metadata associated with the selected piece of electronic media content. Using data objects from the example user database 202 and metadata from the example content database 204, the example content pusher 212 divides the selected piece(s) of electronic media content into one or more groups. The groups are then stored in the variable buffer 210 for pushing to the user or for downloading upon request. The variable buffer 210 may comprise a removable media disk drive, a hard disk drive, a network drive, or any other suitable storage device. To determine which content to assign to which group, the example content pusher 212 evaluates the data objects from the example user database 202 and the metadata from the example content database 204. In particular, the division of the groups is based on the storage capacity of the particular user device in question, a bandwidth associated with the particular user device, a size of the selected piece(s) of electronic media content, and/or any other relevant performance attribute of the user device (e.g., a user defined limit on the amount of permissible pushed content). Once the groups are defined, the content pusher 208 pushes the first group of selected content (which may comprise a first portion of one piece of content, an entire piece of content, or multiple pieces of content) to the user device. One or more subsequent group(s) of content from the current list of ranked media content may or may not be pushed from the variable buffer 212 to the user device. Alternatively, one or more subsequent groups of content may be downloaded from the variable buffer 212 in response to a request from the user. In the event one or more subsequent group(s) of content are pushed to the user device (e.g., after waiting a predetermined length of time such as 24 hours), some or all of the first group of content which has been preloaded on the user device may be overwritten. A version management procedure on the user device or at the example content pusher 212 may control which, if any, content is overwritten. Also, as shown above a given user (e.g., the example user 140 of FIG. 1) may have more than one user device, for example, a fixed set-top-box (e.g., the television set-top-box 116 of FIG. 1) and a portable set-top-box (e.g., the cell phone 120 of FIG. 1). The different devices may have different physical attributes (e.g., different storage capacities and/or bandwidths). As a result, the content pusher 208 of FIG. 2 is configured to divide the content selected by the content selector into two sets of groups, wherein each set is allocated to a respective one of the user's devices and each set substantially duplicates the content of the other set, but the individual groups of content in each set are sized differently to accommodate the capabilities of the device they service.

Flow diagrams representative of example machine readable instructions which can be executed to implement the example content selector 108 of FIG. 2 are shown in FIGS. 6-10. In these examples, the machine readable instructions comprise one or more example programs for execution by a processor, such as the processor 1105 shown in the example processor system 1100 of FIG. 11. The program(s) may be embodied in software stored on a tangible medium such as a CD-ROM, a floppy disk, a hard drive, a digital versatile disk (DVD), or a memory associated with the processor 1105, but persons of ordinary skill in the art will readily appreciate that the entire program(s) and/or parts thereof could alternatively be executed by a device other than the processor 1105 and/or embodied in firmware or dedicated hardware in a well known manner. For example, any or all of the content selector 108, the user database 202, the content database 204, the content matcher 206, the content pusher 208, the variable buffer 210, and/or the example interface 212 could be implemented by firmware, hardware, and/or software. Further, although the example program(s) are described with reference to the flow diagrams illustrated in FIGS. 6-10, persons of ordinary skill in the art will readily appreciate that many other methods of implementing the example program(s) may alternatively be used. For example, the order of execution of the blocks may be changed, and/or some of the blocks described may be changed, eliminated, or combined. Similarly, the execution of the example program(s) and the each block in the example program(s) can be performed iteratively.

Figure 6:
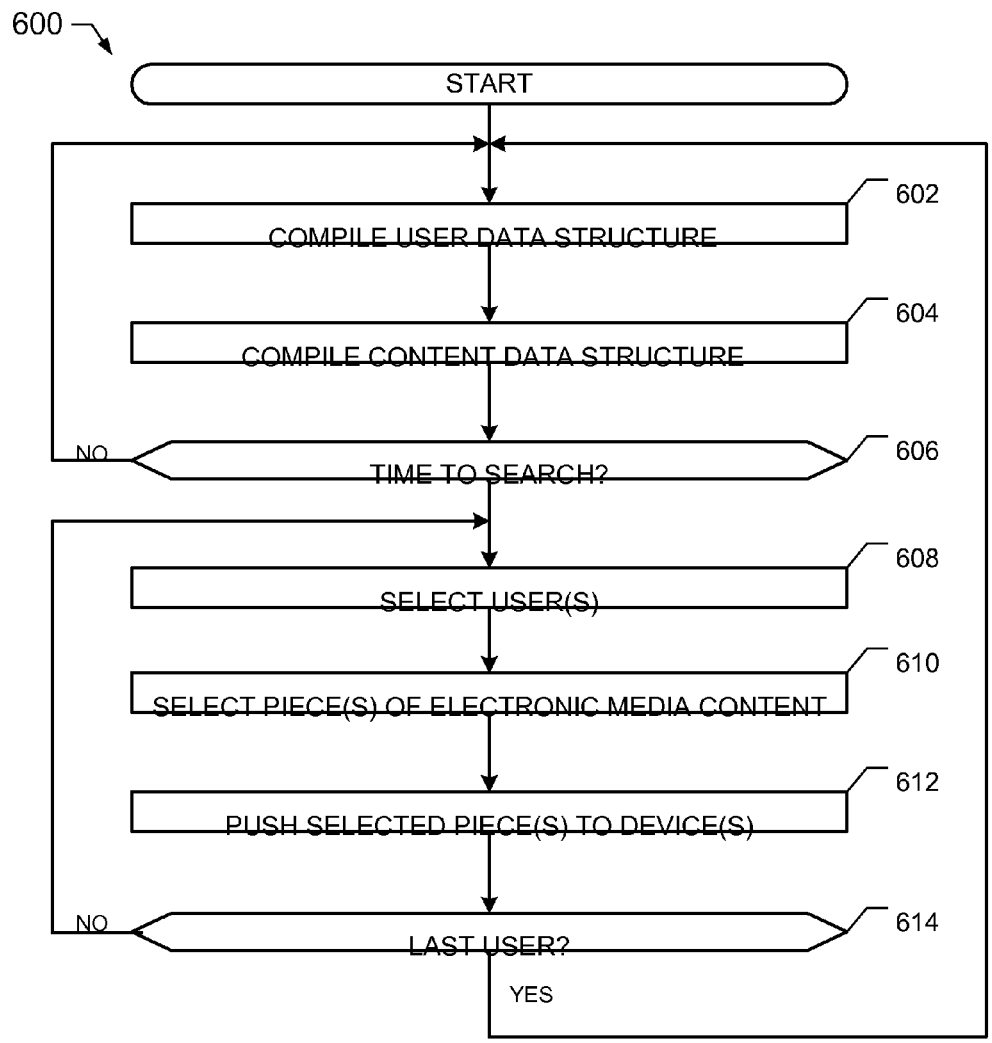
FIG. 6 is a flow chart representation of example machine accessible instructions that may be executed to implement the content selector of FIG. 2.
Figure 7:
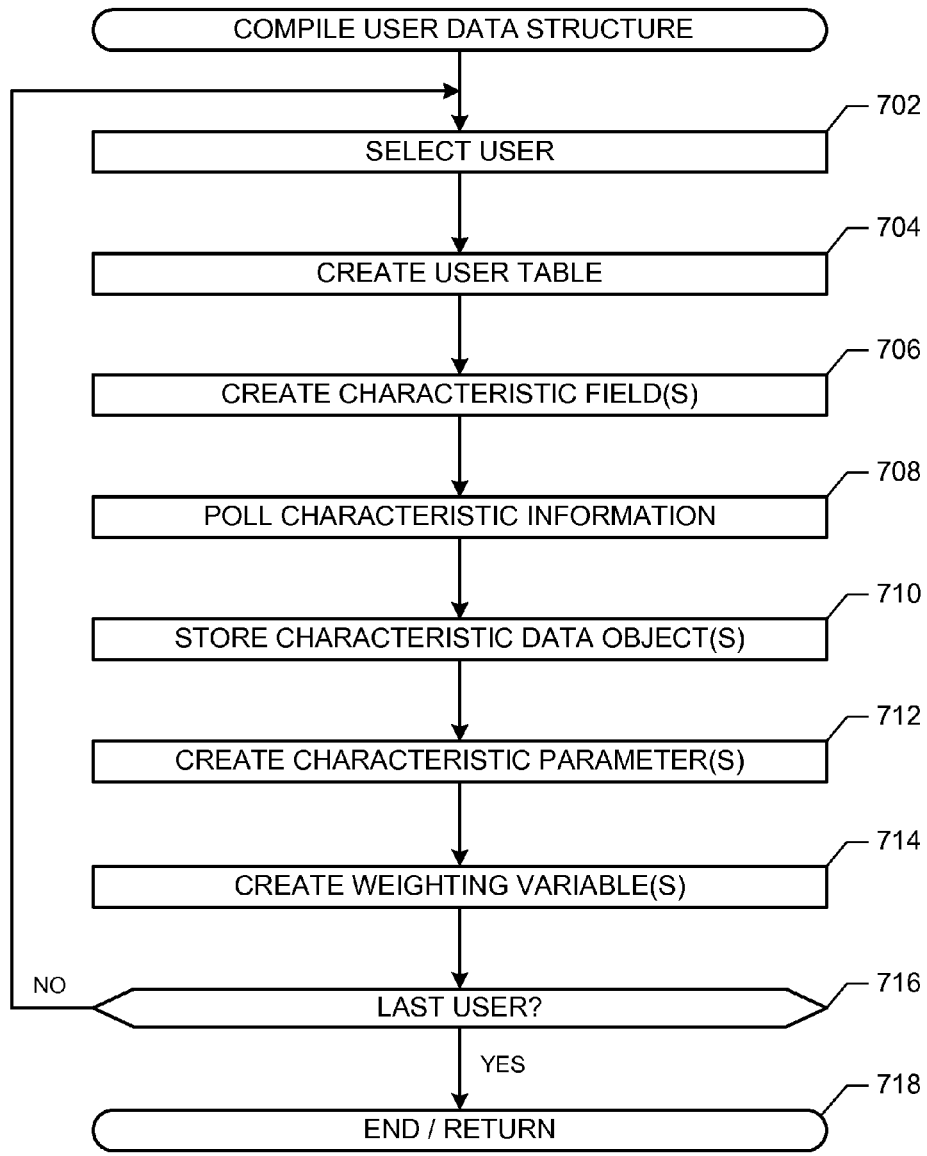
FIG. 7 is a flow chart representation of example machine accessible instructions, which may be executed to compile a user data structure.

The example program 600 of FIG. 6 begins at block 602 where the content selector 108 starts a thread to compile user data structures corresponding to example user(s) (block 602). An example implementation of the user data structure compilation thread is shown in FIG. 7 and is discussed below. After the user data compilation thread is spawned, control proceeds to block 604 where a content data structure compilation thread is spawned to compile one or more content data structure(s) corresponding to one or more pieces of electronic media content (block 604). An example content data structure compilation thread is discussed below and shown in FIG. 8.

After the content data structure compilation thread is spawned (block 604), the example content selector 108 determines whether it is time to search for content to push to one or more users (block 606). If it is not time to search (block 606), control returns to blocks 602 and 604, where any additional needed threads are spawned to cause user data structure compilation for multiple users and/or content data structure compilation threads for multiple pieces of content to proceed in parallel. When it is time to search for content (block 606), control advances to block 608, where the content selector 108 identifies one or more user(s) to be considered for pushed content. (In the following, reference will be made to one selected user for ease of discussion, but persons of ordinary skill in the art will appreciate that more than one user can be processed simultaneously). After a user is selected (block 608), the content matcher 206 selects content for the selected user (block 610). An example manner of implementing the content matcher 206 is discussed below in relation to FIG. 9.

After the content matcher 206 selects one or more pieces of electronic media content for the selected user (block 610), the example content pusher 208 groups the content into one or more groups and pushes the first group of selected electronic media content to a user device associated with the selected user (block 612). An example manner of implementing the content pusher 208 is discussed below in connection with FIG. 10.

After the content pusher 206 has pushed a group of selected content (if any) to the user (block 612), determines whether there are more users to consider for pushed content (block 614). If so, control returns to block 608 where the next user is identified to begin the content matching process. When all users of interest have been considered for content pushing (block 614), control returns to block 602 where any necessary user data structure compilation threads are spawned.

FIG. 7 illustrates an example manner of implementing a user data structure compilation thread called at block 602 of FIG. 6 to compile user data structures of example users. The example user data structure compilation thread 602 of FIG. 7 begins by selecting a user (block 702). Control then advances to block 704 where the content selector 108 creates a user table to identify the example user (i.e., a user identifier) in the example user data structure (block 704). After creating the user table in the user data structure (block 704), the example user data structure compilation thread of FIG. 7 creates one or more fields in the user table associated with the user identifier to contain data objects that describe characteristics of the example user (block 706). After creating the fields in the example user table (block 706), control proceeds to block 708 where the content selector 108 polls one or more electronic information sources to obtain data with which to populate the characteristic fields (block 708). Examples of polling may include data mining, electronic surveys, and/or any other example means to collect information relating to one or more of the characteristics of the example user. Control then proceeds to block 710 where the obtained data is stored in the designated fields created in block 706.

After storing the data objects in the example user data structure (block 710), the example user data structure compilation thread 602 of FIG. 7 creates one or more characteristic parameters associated with the example user in the user data structure (block 712). Subsequently, the example user data structure compilation thread 602 of FIG. 7 creates one or more weighting variables to weight each characteristic parameter created in block 712 (block 714). Control then advances to block 716.

At block 716, the example user data structure compilation thread 602 of FIG. 7 determines if there is an additional user requiring a user data structure. If so, control returns to block 702 to begin the process of creating a data structure for the next user. If all user data structures have been completed, the example user data structure compilation thread 602 of FIG. 7 ends and control returns to block 604 of FIG. 6.

Figure 8:
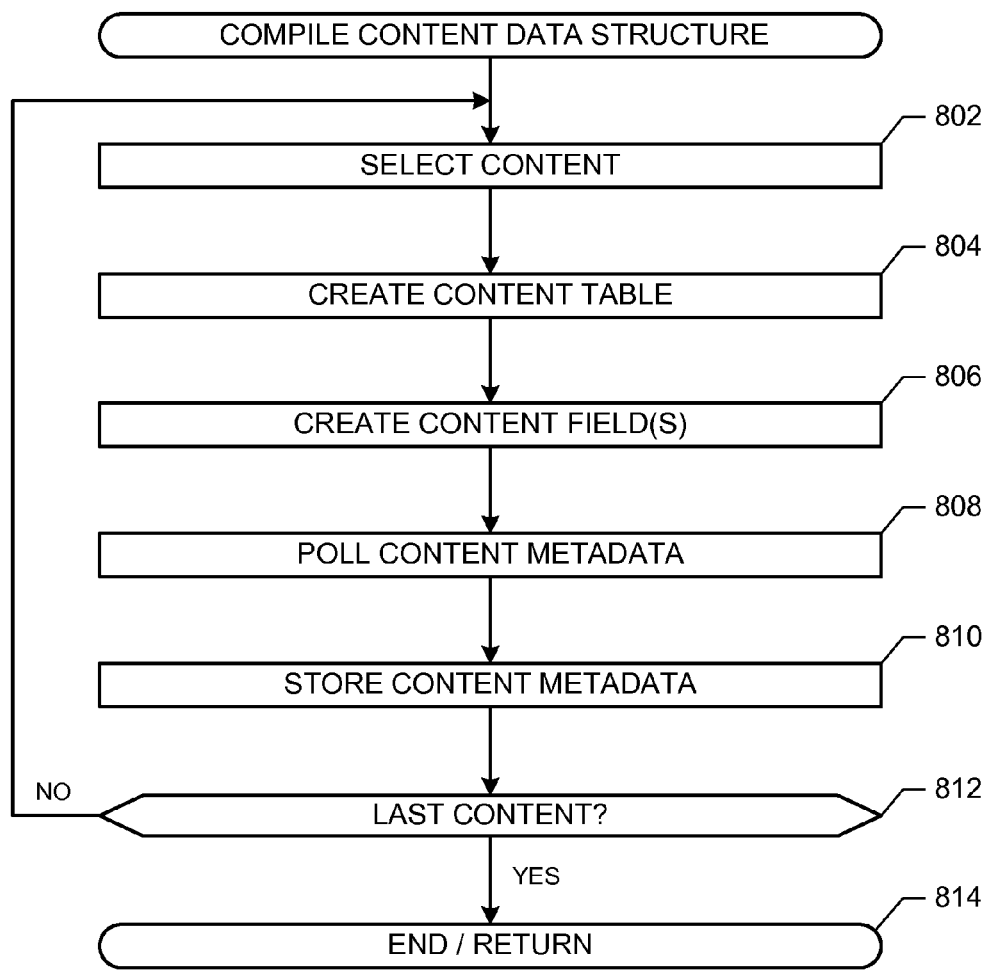
FIG. 8 is a flow chart representation of example machine accessible instructions that may be executed to compile a content data structure.

FIG. 8 illustrates an example manner of implementing the content data structure compilation thread called at block 604 of FIG. 6 to create content data structures for electronic media content. The example content data structure compilation thread 604 of FIG. 8 begins by selecting a piece of electronic media content to process (block 802) and then, create a table to identify the piece of electronic media content (i.e., a content identifier) in a content data structure (block 804). After creating the table in the example content data structure in block 804, the example content data structure compilation thread 604 of FIG. 8 creates one or more fields in the table to store metadata that describes the piece of electronic media content (block 806).

The example content data structure compilation thread 604 then polls electronic information sources associated with the piece of electronic media content for metadata (block 808). Information sources associated with the piece of electronic media content include, for example, a media source associated with the example piece of electronic media content, a network data structures associated with the example piece of electronic media content, or other such information resources for data mining. After polling for metadata (block 808), the example content data structure compilation thread 604 of FIG. 8 stores the polled metadata in the designated fields within the content data structure (block 810). If any additional piece(s) of electronic media content have not been processed (block 812), control returns to block 802 where processing of the next piece of media content begins. If all of the electronic media content has been processed (block 812), control returns to block 604 of FIG. 6 (block 814).

Figure 9:
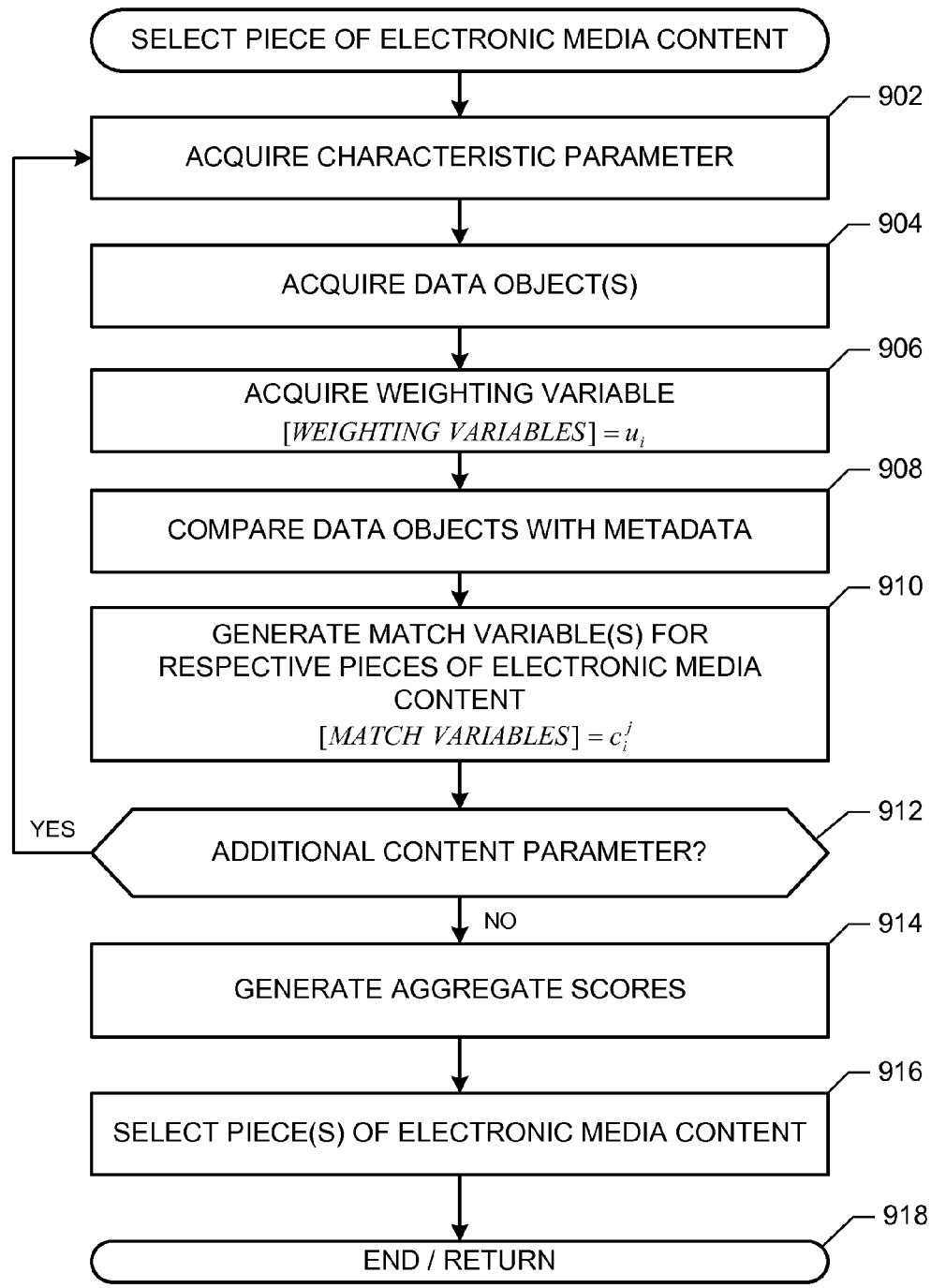
FIG. 9 is a flow chart representation of example machine accessible instructions that may be executed to select one or more pieces of electronic media content.

FIG. 9 illustrates an example manner of implementing the content matcher 206 to select electronic media content for a user. The example program of FIG. 9 begins by retrieving the characteristic parameters stored in the user data structure for the user in question (i.e., the user selected at block 608) (block 902). As discussed above, the characteristic parameter is a pointer to certain data objects describing certain characteristics of a particular user that will be used for content matching for that user. After acquiring the characteristic parameters (block 902), the example content selection thread 610 of FIG. 9 obtains the data objects from the user data structure that are indexed by the characteristic parameter (block 904). Also, the example content selection thread 610 of FIG. 9 proceeds to obtain the weighting variable ($u_i$) associated with the characteristics parameter obtained in block 902 (block 906). After acquiring the weighting variable ($u_i$) in block 906, the example content selection thread 610 of FIG. 9 compares the obtained data objects from block 902 with the metadata in the content data structure (block 908). To compare the data objects and the metadata in block 908, the example content selection thread 610 of FIG. 9 matches keywords, or as discussed above related keywords.

From the comparison executed in block 908, the example content selection thread 610 of FIG. 9 generates a match variable ($c_i^j$), whose value quantifies the number of matches between data objects and metadata (block 910). If an additional characteristic parameter is associated with the example user (block 912), the example content selection thread 610 of FIG. 9 repeats blocks 902-912 with the next characteristic parameter.

If no additional characteristic parameters are associated with the user, the example content selection thread 610 of FIG. 9 proceeds to generate an aggregate score for each piece of electronic media content whose metadata is compared in block 908 (block 914). After generating the aggregate scores in block 914, the example content selection thread 610 of FIG. 9 selects one or more pieces of electronic media content from the aggregate scores (block 916). After selecting the piece(s) of electronic media content (block 916), the example content selection thread 610 of FIG. 9 ends and returns control to the example program 600 of FIG. 6.

Figure 10:
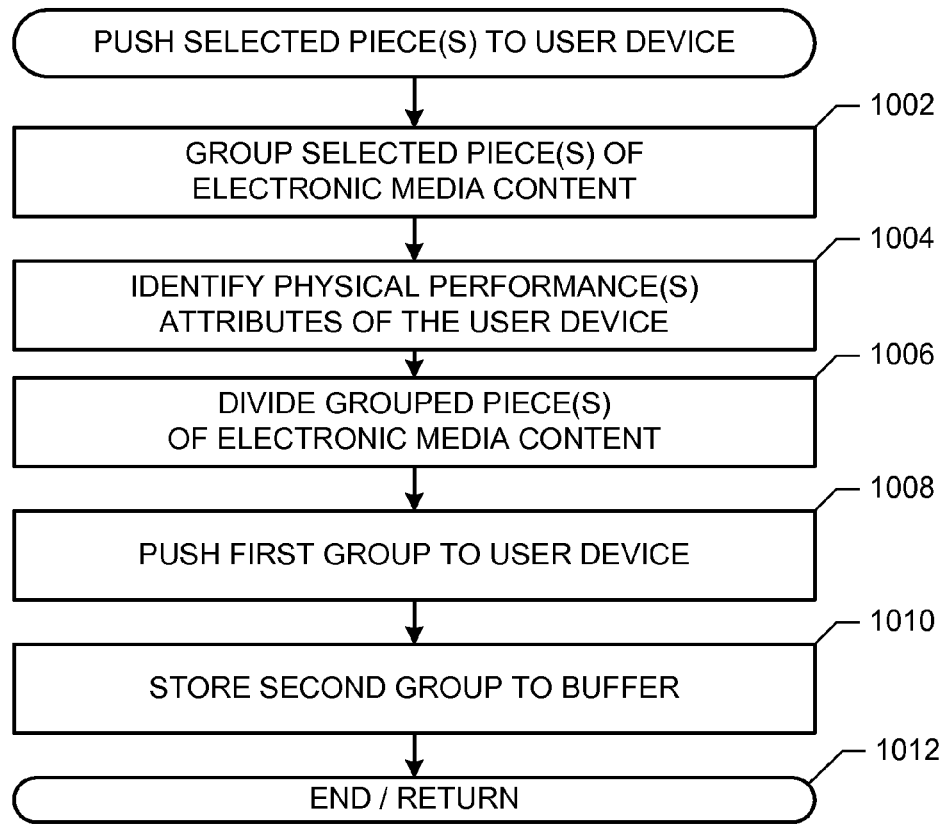
FIG. 10 is a flow chart representation of example machine accessible instructions, which may be executed to push one or more pieces of electronic media content to a user device.

FIG. 10 illustrates an example content push thread 612 of FIG. 6 to push a selected piece of electronic media content to a device. The example content push thread 612 of FIG. 10 begins by grouping the selected piece(s) of electronic media content from block 612 of FIG. 6 (block 1002). After grouping the selected piece(s) of electronic media content in block 1002, the example content push thread 612 proceeds to block 1004 to identify the address of the user device and one or more performance attribute (e.g., a storage capacity of the user device, etc.) from the user data structure (block 1004). From the identified performance attribute(s) of the user device (block 1004), the example content push thread 612 of FIG. 10 proceeds to block 1006 to divide the grouped pieces of electronic media content from block 1002 into a first group and a second group (block 1006). To divide the grouped pieces of electronic media content, the example content push thread 612 of FIG. 10 evaluates the performance attribute(s) of the device and/or the size of the grouped piece(s) of electronic media content. After dividing the grouped piece(s) of electronic media content into a first group and a second group in block 1006, the example content push thread 612 pushes the first group to the user device as described above (block 1008). The example content push thread 612 of FIG. 10 stores the second group to a buffering device (block 1010). After the second group is stored to the buffering device in block 1010, the example content push thread 612 of FIG. 10 ends and returns control to the example program 600.

Figure 11:
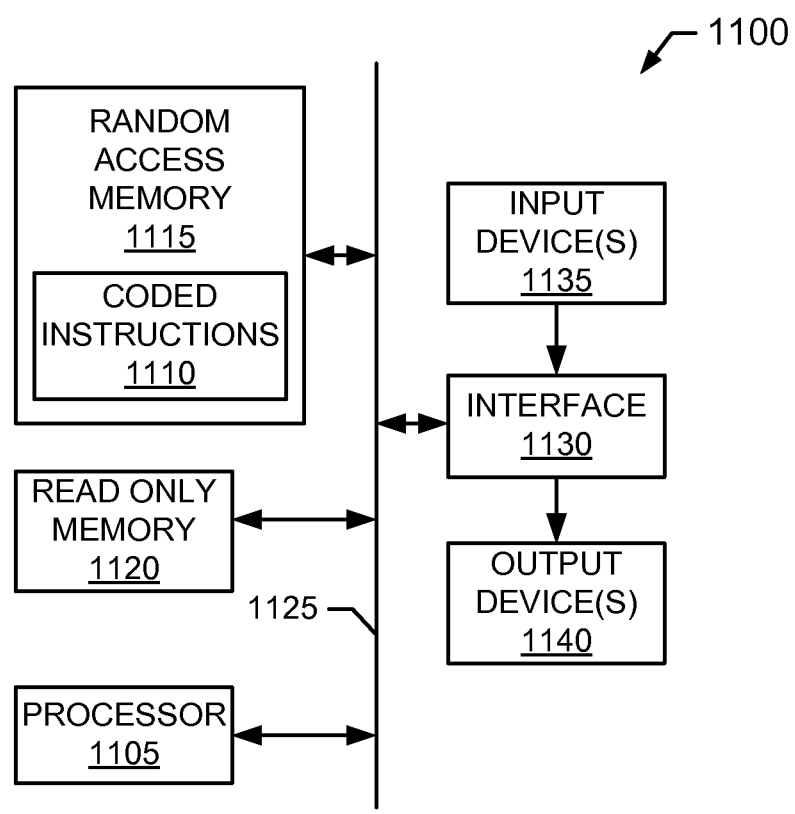
FIG. 11 is a schematic illustration of an example processing system that may be used to execute the machine executable instruction of FIGS. 5-8 and/or 9 to implement the example content selector of FIG. 2.

FIG. 11 is a schematic diagram of an example processor platform 1100 that may be used and/or programmed to implement the example content selector 200 of FIG. 2, including the example user database 202, the example content database 204, the example content matcher 206, the content pusher 208, the variable buffer 210, the interface circuit 212, and/or the communication interface 218. For example, the processor platform 1100 can be implemented by one or more general purpose single-thread and/or multi-threaded processors, cores, microcontrollers, etc. The processor platform 1100 may also be implemented by one or more computing devices that contain any of a variety of concurrently-executing single-thread and/or multi-threaded processors, cores, microcontrollers, etc.

The processor platform 1100 of the example of FIG. 11 includes at least one general purpose programmable processor 1105. The processor 1105 executes coded instructions 1110 present in main memory of the processor 1105 (e.g., within a RAM 1115). The coded instructions 1110 may be used to implement the instructions represented by the example programs of FIGS. 6-10. The processor 1105 may be any type of processing unit, such as a processor core, processor and/or microcontroller. The processor 1105 is in communication with the main memory (including a read-only memory (ROM) 1120 and the RAM 1115) via a bus 1125. The RAM 1115 may be implemented by dynamic RAM (DRAM), Synchronous DRAM (SDRAM), and/or any other type of RAM device, and ROM may be implemented by flash memory and/or any other desired type of memory device. Access to the memory 1115 and 1120 may be controlled by a memory controller (not shown). The RAM 1115 may be used to store data associated with, for example, the example user database 202, the example content database 204, the example content matcher 206, the content pusher 208, and the variable buffer 210.

The processor platform 1100 also includes an interface circuit 1130. The interface circuit 1130 may be implemented by any type of interface standard, such as an external memory interface, serial port, general purpose input/output, etc. One or more input devices 1135 and one or more output devices 1140 are connected to the interface circuit 1130. The interface circuit 1130 may be used to the example interface circuit 212 of FIG. 2.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   determining a first capability associated with a first media device of a user;
   determining a second capability associated with a second media device of the user;
   segmenting, via a processor, a piece of electronic media selected for the user into a first plurality of portions according to the first capability of the first media device;
   when the second capability of the second media device is different from the first capability of the first media device, segmenting the piece of electronic media into a second plurality of portions according to the second capability of the second media device, the second plurality of portions to be sized differently than the first plurality of portions;
   pushing a first one of the first plurality of portions to the first media device prior to the user requesting the first piece of electronic media; and
   pushing a first one of the second plurality of portions to the second media device prior to the user requesting the first piece of electronic media, wherein the determining of the first capability of the first media device is based on a first storage capacity of the first media device, the determining of the second capability of the second media device is based on a second storage capacity of the second media device, the pushing of the first one of the first plurality of portions is performed based on a current geographic location of the user, a future geographic location of the user, a personal interest of the user, a preference of the user, a commute time duration associated with a trip to be taken by the user, and weighting values or scores associated with the piece of electronic media.

2. A method as defined in claim 1, further comprising conveying a second one of the first plurality of portions to the first media device in response to the user requesting the piece of electronic media via the first media device.

3. A method as defined in claim 1, further comprising conveying a second one of the second plurality of portions to the second media device in response to the user requesting the piece of electronic media via the second media device.

4. A method as defined in claim 1, further comprising conveying a second one of the first plurality of portions to the first media device after waiting a period of time from the pushing of the first one of the first plurality of portions to the first media device.

5. A method as defined in claim 1, wherein the piece of electronic media
   is selected for the user by comparing a characteristic associated with the user to an attribute associated with the piece of electronic media.

6. A method as defined in claim 1, wherein the first media device comprises a set-top box, and the second media device comprises a mobile phone.

7. A tangible machine readable storage memory comprising instructions that, when executed, cause a processor to perform operations comprising:
   determining a first capability associated with a first media device of a user;
   determining a second capability associated with a second media device of the user;
   segmenting a piece of electronic media selected for the user into a first plurality of portions according to the first capability of the first media device;
   when the second capability of the second media device is different from the first capability of the first media device, segmenting the piece of electronic media into a second plurality of portions according to the second capability of the second media device, the second plurality of portions to be sized differently than the first plurality of portions;
   pushing a first one of the first plurality of portions to the first media device prior to the user requesting the first piece of electronic media; and
   pushing a first one of the second plurality of portions to the second media device prior to the user requesting the first piece of electronic media, wherein the determining of the first capability of the first media device is based on a first storage capacity of the first media device, the determining of the second capability of the second media device is based on a second storage capacity of the second media device, the pushing of the first one of the first plurality of portions is performed based on a current geographic location of the user, a future geographic location of the user, a personal interest of the user, a preference of the user, a commute time duration associated with a trip to be taken by the user, and weighting values or scores associated with the piece of electronic media.

8. A storage memory as defined in claim 7, wherein the operations further comprise conveying a second one of the first plurality of portions to the first media device in response to the user requesting the piece of electronic media via the first media device.

9. A storage memory as defined in claim 7, wherein the operations further comprise conveying a second one of the second plurality of portions to the second media device in response to the user requesting the piece of electronic media via the second media device.

10. A storage memory as defined in claim 7, wherein the operations further comprise conveying a second one of the first plurality of portions to the first media device after waiting a period of time from the pushing of the first one of the first plurality of portions to the first media device.

11. A storage memory as defined in claim 8, wherein the piece of electronic media is selected for the user by comparing a characteristic associated with the user to an attribute associated with the piece of electronic media.

12. A storage memory as defined in claim 8, wherein the first media device comprises a set-top box, and the second media device comprises a mobile phone.

13. An apparatus comprising:
    memory to store machine readable instructions; and
    a processor to execute the machine readable instructions to perform operations comprising:
        determining a first capability associated with a first media device of a user;
        determining a second capability associated with a second media device of the user;
        segmenting a piece of electronic media selected for the user into a first plurality of portions according to the first capability of the first media device;
        when the second capability of the second media device is different from the first capability of the first media device, segmenting the piece of electronic media into a second plurality of portions according to the second capability of the second media device, the second plurality of portions to be sized differently than the first plurality of portions;
        pushing a first one of the first plurality of portions to the first media device prior to the user requesting the first piece of electronic media; and pushing a first one of the second plurality of portions to the second media device prior to the user requesting the first piece of electronic media, wherein the determining of the first capability of the first media device is based on a first storage capacity of the first media device, the determining of the second capability of the second media device is based on a second storage capacity of the second media device, the pushing of the first one of the first plurality of portions is performed based on a current geographic location of the user, a future geographic location of the user, a personal interest of the user, a preference of the user, a commute time duration associated with a trip to be taken by the user, and weighting values or scores associated with the piece of electronic media.

14. An apparatus as defined in claim 13, wherein the operations further comprise conveying a second one of the first plurality of portions to the first media device in response to the user requesting the piece of electronic media via the first media device.

15. An apparatus as defined in claim 13, wherein the operations further comprise conveying a second one of the second plurality of portions to the second media device in response to the user requesting the piece of electronic media via the second media device.

16. An apparatus as defined in claim 13, wherein the operations further comprise conveying a second one of the first plurality of portions to the first media device after waiting a period of time from the pushing of the first one of the first plurality of portions to the first media device.

17. An apparatus as defined in claim 13, wherein the piece of electronic media is selected for the user by comparing a characteristic associated with the user to an attribute associated with the piece of electronic media.

18. An apparatus as defined in claim 13, wherein the first media device comprises a set-top box, and the second media device comprises a mobile phone.

* * * * *